United States Patent
Carey

(10) Patent No.: US 6,902,088 B2
(45) Date of Patent: Jun. 7, 2005

(54) TRAILER HITCH ASSEMBLY FOR SUPPORT OF A TENNIS NET ASSEMBLY

(75) Inventor: Paul Thomas Carey, Clarkston, WA (US)

(73) Assignee: J.A. Cissel Mfg. Co., Lakewood, NJ (US)

( * ) Notice: Subject to any disclaimer, the term of this patent is extended or adjusted under 35 U.S.C. 154(b) by 181 days.

(21) Appl. No.: 10/459,144

(22) Filed: Jun. 12, 2003

(65) Prior Publication Data

US 2004/0011839 A1 Jan. 22, 2004

Related U.S. Application Data

(60) Provisional application No. 60/393,414, filed on Jul. 5, 2002.

(51) Int. Cl.[7] ................................................. B60R 9/06
(52) U.S. Cl. ........................ 224/520; 224/519; 224/521; 224/531
(58) Field of Search ................................ 224/511, 518, 224/519, 520, 521, 531; 280/762; 473/459, 462

(56) References Cited

U.S. PATENT DOCUMENTS

| | | | | |
|---|---|---|---|---|
| 5,472,212 A | * | 12/1995 | Bercaw | 473/462 |
| 5,800,294 A | * | 9/1998 | Naecker, Jr. | 224/519 |
| 5,950,617 A | * | 9/1999 | Lorenz | 224/519 |
| 6,314,891 B1 | * | 11/2001 | Larson | 224/521 |
| 6,390,344 B1 | * | 5/2002 | Edgerly | 224/531 |
| 6,607,002 B2 | * | 8/2003 | Reese | 224/519 |
| 6,662,983 B2 | * | 12/2003 | Lane et al. | 224/521 |

* cited by examiner

Primary Examiner—Gary E. Elkins
(74) Attorney, Agent, or Firm—Clifford G. Frayne

(57) ABSTRACT

A support assembly cooperative with a vehicular trailer hitch for allowing the temporary erection of a tennis net assembly, the support assembly comprising a T-shaped tubular support member having a horizontal member and a vertical member, in one embodiment, the horizontal member having a tubular cross section cooperative with the internal diameter of a tubular cross section of a trailer hitch for the slidable engagement thereof and the vertical tubular member being of a cross section to slidably receive a vertically oriented tennis post of corresponding cross section, the T-shaped tubular member having a securing means to temporarily secure the member to the trailer hitch and a securing means to temporarily secure the tennis post within the tubular vertical member, a similar supporting member cooperative with a separate vehicular trailer hitch securing the opposing tennis post, and the concomitant tennis net therebetween.

8 Claims, 3 Drawing Sheets

TRAILER HITCH ASSEMBLY FOR SUPPORT OF A TENNIS NET ASSEMBLY

RELATED APPLICATIONS

Applicant claims the benefit of provisional application Ser. No. 60/393,414 filed Jul. 5, 2002.

BACKGROUND OF THE INVENTION

1. Field of the Invention

The present invention relates to a support assembly for supporting a tennis post and a tennis net in an erect orientation, and more particularly, to a support assembly cooperative with a vehicular mounted trailer hitch to permit the erection of a tennis post and tennis net wherever so desired.

2. Description of the Prior Art

The popularity of the sport of tennis is well documented. Where the climate is moderate to warm, the sport is played outdoors year round and in some locales tennis clubs are as common as golf clubs. Still further, golf clubs often incorporate tennis courts in their facilities. In inclement weather, tennis can be played indoors in either fixed facilities or within inflatable bubbles. Municipalities even construct tennis courts on public property so that residents may have access to the facilities and the sport.

To much of the populous, private tennis clubs are cost prohibitive and that portion of the populous must rely upon municipally funded public courts in order to enjoy the sport. With its ever increasing popularity the court time, even on public courts, must sometimes be allotted. Still further, to have one's own private court requires a considerable cost expenditure as well as a sufficient sized property to accommodate the dimensions of a standardized tennis court.

With the limitations on the number of courts available and the increasing number of people wishing to learn or play the sport, many players knowledgeable with the game cannot always play as often as they desire and many individuals, particularly children, are not given the opportunity to be introduced to the game or be coached with respect to the fundamentals of racket control, serving and volleying. There therefore exists a need for the ability to be able to erect a tennis net in a temporary manner in order to take advantage of some temporarily unused open space so as to either lay out a court and play a game of tennis or practice one's game by volleying, or be able to erect a temporary tennis net and court layout so as to introduce young children who may be disadvantaged to the sport.

OBJECTS OF THE INVENTION

An object of the present invention is to provide for a novel support assembly cooperative with a vehicular trailer hitch which allows for the temporary erection of a tennis net assembly in an open area such as a vacant parking lot.

Another object of the present invention is to provide for a novel support assembly for the temporary erection of a tennis net assembly which is easily set up and easily broken down in a minimal amount of time.

A still further object of the present invention is to provide for a novel support assembly which is cooperative with a variety of vehicular mounted trailer hitches.

A still further object of the present invention is to provide for a novel support assembly cooperative with a vehicular trailer hitch to permit the temporary erection of a tennis net assembly so as to increase the availability of a tennis court for playing, teaching, and/or introducing the sport to individuals.

SUMMARY OF THE INVENTION

A support assembly cooperative with a vehicular trailer hitch for allowing the temporary erection of a tennis net assembly, the support assembly comprising a T-shaped tubular support member having a horizontal member and a vertical member, in one embodiment, the horizontal member having a tubular cross section cooperative with the internal diameter of a tubular cross section of a trailer hitch for the slidable engagement thereof and the vertical tubular member being of a cross section to slidably receive a vertically oriented tennis post of corresponding cross section, the T-shaped tubular member having a securing means to temporarily secure the member to the trailer hitch and a securing means to temporarily secure the tennis post within the tubular vertical member, a similar supporting member cooperative with a separate vehicular trailer hitch securing the opposing tennis post, and the concomitant tennis net therebetween.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
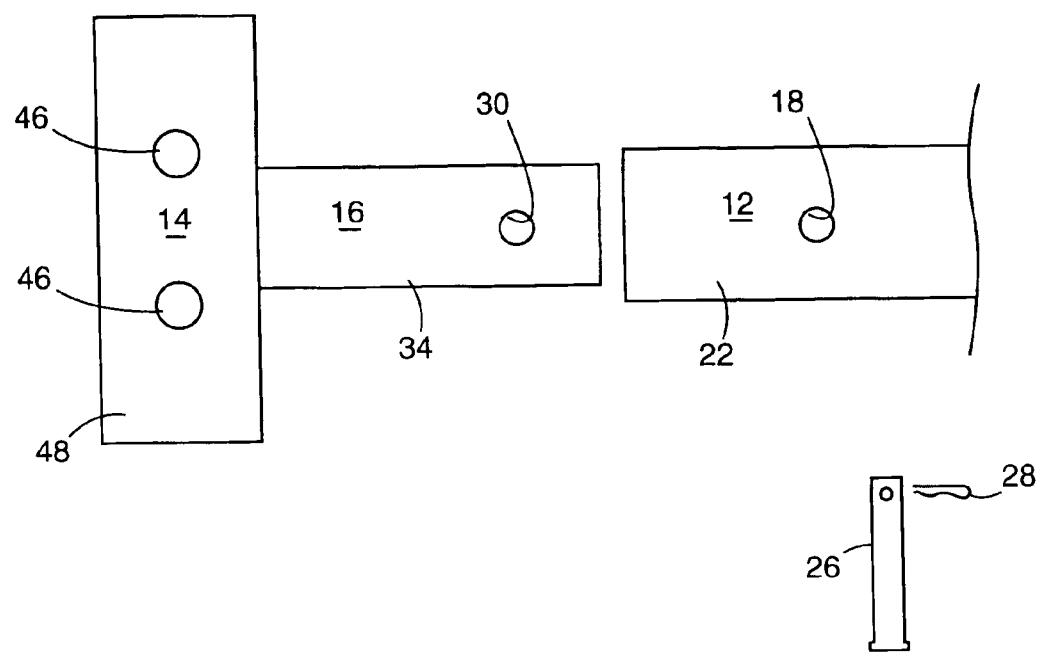
FIG. 1 is a side view of a first embodiment of the support member of the present invention.
Figure 2:
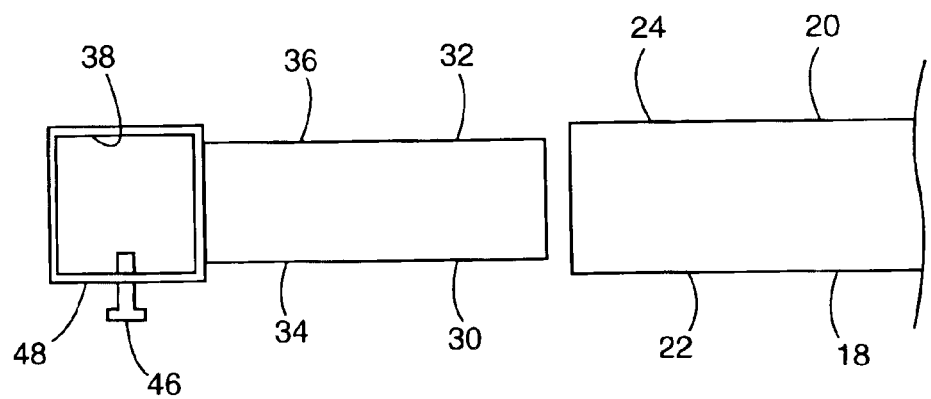
FIG. 2 is a top view of a first embodiment of the support member of the present invention.

FIG. 1 is a side view of a first embodiment of the present invention and FIG. 2 is a top view of a first embodiment of the present invention. The present invention comprises a support member 10 in cooperation with a vehicular trailer hitch 12 to support a tennis post and tennis net in an erect orientation. Support member 10 is a T-shaped tubular member comprising a vertical tubular member 14 and a horizontal tubular member 16 secured thereto. Horizontal tubular member 16 is approximately 2 inches square in cross section so as to be slidably accommodatable within a standard two square inch inner diameter trailer hitch 12 normally found secured to the rear of a vehicle beneath the bumper. The trailer hitch 12 normally comes standard with aligned apertures 18 and 20 formed in side walls 22 and 24. Apertures 18 and 20 are in alignment and accommodate a locking pin 26 which passes therethrough and can be secured by a cotter pin 28 at one end. Horizontal arm member 16 is formed with apertures 30 and 32 in its vertical side walls 34 and 36, apertures 30 and 32 being in alignment and registerably alignable with the apertures 18 and 20 in trailer hitch 14 such that locking pin 26 can pass through the apertures and secure support member 10 to the trailer hitch with vertical tubular member 14 in a vertical orientation. In the embodiment illustrated in FIGS. 1 and 2, vertical tubular member 14 is square in cross sectional area and presents a square-shaped bore 38. Square-shaped bore 38 is designed to accommodate and slidably receive a tennis post 40 having an upper end 42 and a lower end 44. Tennis post 40 is slidably receivable within square-shaped bore 38 such that its lower end 44 engages the ground or other surface beneath the vehicle. A frictional securing means 46 positioned on a side wall 48 of the vertical member 14 can then be tightened to secure tennis post 40 within vertical tubular member 14. In the embodiment illustrated, the securing means 46 would be threaded bolt having a hand engageable knob extending therefrom for ease of tightening and loosening. Alternatively, a through pin 45 could be inserted through alignable apertures in the lower portion of vertical tubular member 14 and through alignable apertures formed in the tennis post for additional integrity. The tennis post 40 would then have secured to it one end of a standard tennis net 50.

If a rigid vertical object were present to which the opposing end of the tennis net could be secured in an erect orientation, then a single vehicle having the trailer hitch as set forth herein could be positioned the appropriate distance from this rigid vertical object to support the tennis post 40 and the opposing end of the tennis net 50. If no such rigid vertical object were present, then a second vehicle utilizing the support member 10 in the manner described herein could be positioned the appropriate distance away from the first vehicle and support a second tennis post in the manner thus described thereby maintaining a tennis net in an erect orientation.

Figure 3:
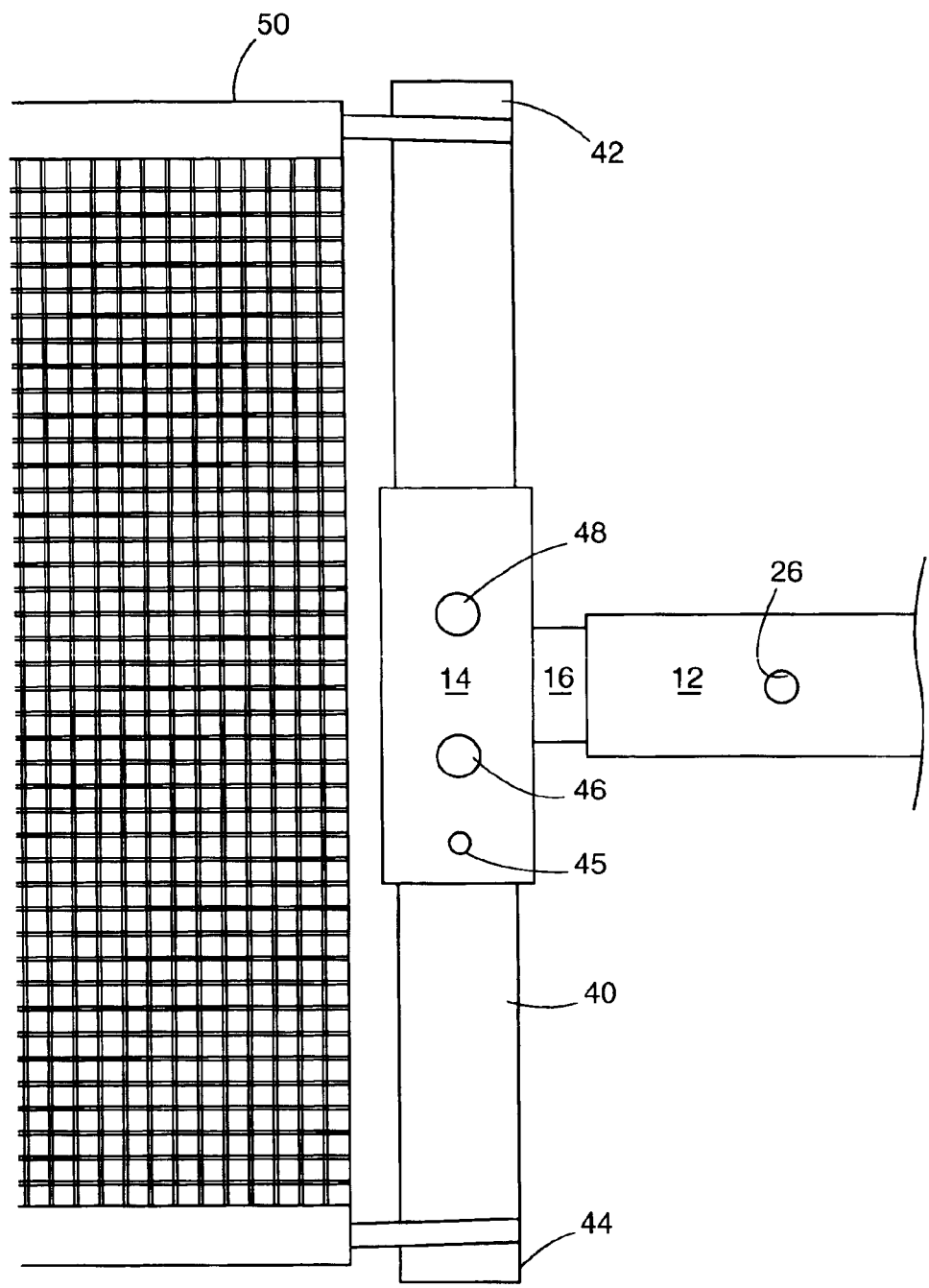
FIG. 3 is a side view of the present invention in cooperation with a tennis net, tennis post and a vehicular trailer hitch.
Figure 4:
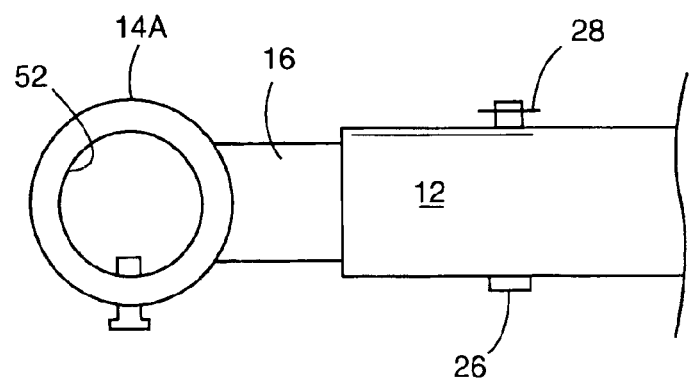
FIG. 4 is a top view of a second embodiment of the support member of the present invention.

While FIGS. 1, 2, and 3 have described the tennis post support member having a vertical tubular member with a square cross section, the preferable embodiment as illustrated in FIG. 4 is a vertical tubular member 14A having a circular cross section 52 to accommodate a tennis post of circular cross section which is the most common form of cross section. The mounting method and the frictional securing of the post within the vertical mounting member would be identical as to that described in FIGS. 1 through 3.

Figure 5:
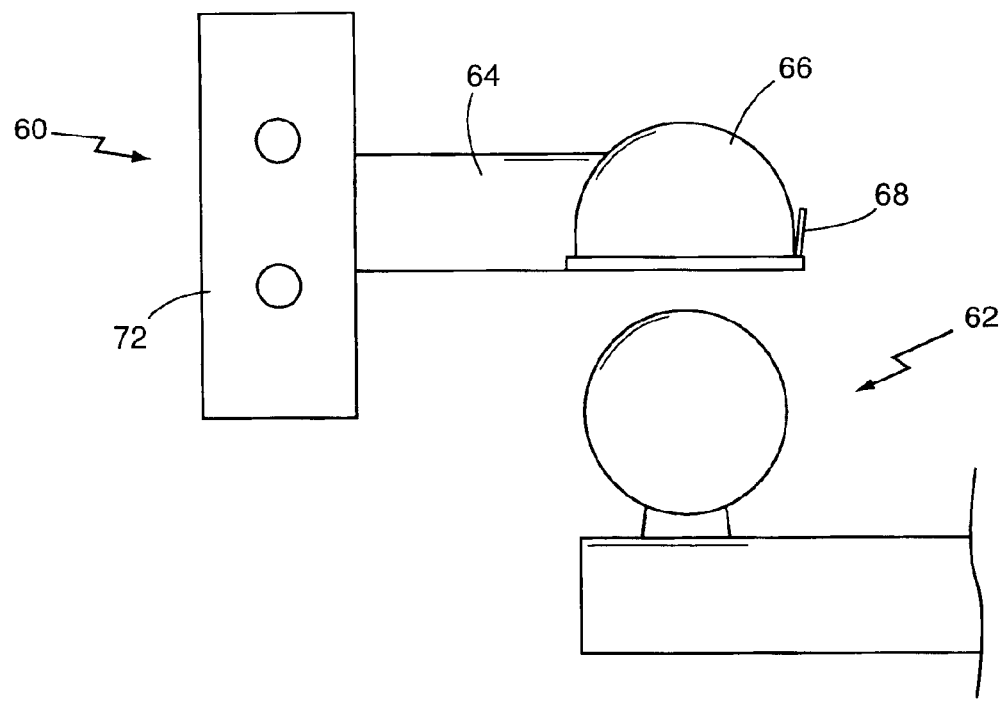
FIG. 5 is a side view of a still further embodiment of the support member of the present invention.

In a still further embodiment of the present invention as illustrated in FIG. 5, a support member 60 similar with the embodiments illustrated in FIGS. 1 through 4 could be fabricated to be adapted to a trailer hitch 62 of the ball type variety. In this embodiment, the horizontal arm member 64 of a support member 60 would terminate with a domed locking member 66 similar to that utilized on trailers which are attached to trailer hitches of the ball type variety. Once dome locking member 66 was locked in place over the ball hitch 62 by lever mechanism 68, there remains an extended horizontal arm 64 supporting a vertical tubular member 72 of appropriate cross section to support a tennis post and concomitant tennis net in erect orientation as previously described.

The present invention has been described with respect to the exemplary embodiments thereof, it will be recognized by those of skill in the art that many modifications or changes can be achieved without departing from the spirit and scope of the invention. Therefore it is manifestly intended that the invention be limited only by the scope of the claims and the equivalence thereof.

I claim:

1. A vehicle having a combination of a portable tennis post and tennis net assembly and a vehicle hitch, said portable tennis post and tennis net assembly being mounted to said vehicle hitch comprising:

a tubular hitch member secured to the underside of a chassis of a vehicle, said tubular hitch member defining a rectangular bore, said tubular hitch member having aligned apertures formed in opposing side walls thereof for receipt of a locking pin;

a T-shaped support member having a horizontal tubular support member and a vertical tubular support member, said horizontal tubular support member having a cross section approximating said bore of said tubular hitch member secured to said chassis and slidably receivable within said tubular hitch member secured to said chassis, said horizontal tubular support member having a plurality of apertures alignable with said apertures in said tubular hitch member secured to said chassis for receipt of said locking pin to maintain said horizontal tubular support member within said tubular hitch member secured to said chassis of said vehicle, said horizontal member secured to said vertical tubular support member, said horizontal tubular support member defining a throughbore for the slidable receipt of a tennis post therethrough, said tennis post having secured thereto a tennis net extending therefrom.

2. The portable tennis post and tennis net assembly in accordance with claim 1 wherein said vertical tubular support member has means for engaging said tennis post within said vertical tubular support member.

3. The portable tennis post and tennis net assembly in accordance with claim 2 wherein said vertical tubular support member has apertures alignable with apertures in said tennis post for the receipt of a locking pin securing said tennis post to said vertical tubular support member.

4. The portable tennis post and tennis net assembly in accordance with claim 1 wherein an opposing end of said tennis net and complimentary tennis post are secured to a complimentary support member secured to a vehicle hitch in like manner.

5. A vehicular hitch mountable support member for the support and erection of a portable tennis post and tennis net assembly wherein said vehicular hitch comprises a tubular hitch member having a rectangular bore secured to a chassis of a vehicle, said tubular hitch member has a plurality of apertures for receipt of a lock pin, said support assembly comprising:

a T-shaped support member having a horizontal tubular support member and a vertical tubular support member, said horizontal tubular support member having a cross section approximate said bore of said tubular hitch member secured to said chassis of said vehicle, said vertical tubular support member having a throughbore complimentary with the cross section of a tennis post for slidable receipt therethrough, said vertical tubular support member having a securing means engageable with said tennis post, said tennis post having secured thereto and supported in an erect orientation, a tennis net.

6. The portable tennis post and tennis net assembly in accordance with claim 5 wherein an opposing end of said tennis net is supported in a manner as described in claim 5.

7. The portable tennis post and tennis net assembly in accordance with claim 5 wherein said securing means on said vertical tubular support member comprises a lock pin insertable between apertures formed on said vertical tubular support member and alignable apertures formed on said tennis post.

8. The portable tennis post and tennis net assembly in accordance with claim 5 wherein said securing means on said vertical tubular support member comprises a plurality of fasteners frictionally engaging a side wall of said tennis post.

* * * * *